US011755986B1

(12) United States Patent
Martin

(10) Patent No.: US 11,755,986 B1
(45) Date of Patent: *Sep. 12, 2023

(54) COMBINED FLOW-THRU FACIAL RECOGNITION FOR MASS SPECTATOR EVENT ENTRY AND ITEM FULFILLMENT SYSTEM AND METHOD

(71) Applicant: Todd Martin, Aubrey, TX (US)

(72) Inventor: Todd Martin, Aubrey, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,144

(22) Filed: Mar. 23, 2023

Related U.S. Application Data

(63) Continuation of application No. 17/727,862, filed on Apr. 25, 2022, now Pat. No. 11,625,665.

(60) Provisional application No. 63/325,055, filed on Mar. 29, 2022.

(51) Int. Cl.
| | |
|---|---|
| *G06Q 10/083* | (2023.01) |
| *G07C 9/37* | (2020.01) |
| *G06Q 10/0832* | (2023.01) |
| *G06V 40/16* | (2022.01) |

(52) U.S. Cl.
CPC ....... *G06Q 10/083* (2013.01); *G06Q 10/0832* (2013.01); *G06V 40/171* (2022.01); *G06V 40/172* (2022.01); *G07C 9/37* (2020.01)

(58) Field of Classification Search
CPC .. G06Q 30/0635; G06Q 10/02; G06V 40/161; G06V 40/172
See application file for complete search history.

(56) References Cited

U.S. PATENT DOCUMENTS

| | | | | |
|---|---|---|---|---|
| 3,700,318 A | * | 10/1972 | Cunningham, Jr. | ..... G03B 1/56 352/225 |
| 9,053,357 B2 | * | 6/2015 | Yagnik | ................. G06V 40/172 |
| 9,269,150 B1 | * | 2/2016 | Seitz | ......................... G06T 7/73 |
| 9,305,155 B1 | * | 4/2016 | Vo | ....................... G06F 3/04817 |

(Continued)

FOREIGN PATENT DOCUMENTS

| | | |
|---|---|---|
| AU | 2021101072 | 4/2021 |
| AU | 2021101072 A4 * | 4/2021 |

(Continued)

OTHER PUBLICATIONS

Steve Lawrence, "Face Recognition: A convolutional Neural network Approach", published by IEEE Transactions on Neural Networks, vol. 8 on Jan. 1997 (Year: 1997).*

*Primary Examiner* — Omar Zeroual
(74) *Attorney, Agent, or Firm* — Todd Martin

(57) ABSTRACT

A contactless system and method for mass attendee event venue entry and item delivery system for facilitating expeditious and controlled entry of an influx of people to the event without overwhelming event venue employees or resources. A digital entry image of a person is taken by a camera (106) as the person moves through a photo zone (124). The digital entry image is compared using facial recognition technology with a stored profile image of the person to identify the person and confirm authorized entry into the event without the need for the person to present a ticket or pass for the particular event. Procurement and delivery of any item pre-selected by the person directly to the person's allocated seating may be confirmed using the same facial recognition image comparison used to confirm authorized entry of the person into the event venue.

16 Claims, 4 Drawing Sheets

(56) References Cited

U.S. PATENT DOCUMENTS

| | | | |
|---|---|---|---|
| 10,129,716 B1* | 11/2018 | Ronnau | H04W 4/02 |
| 10,282,904 B1* | 5/2019 | Ramesh | G06F 3/015 |
| 10,326,921 B2* | 6/2019 | Chien | H04N 23/51 |
| 10,347,063 B1* | 7/2019 | LaRovere | G07C 9/00563 |
| 10,803,432 B1* | 10/2020 | Miles | G06Q 20/208 |
| 10,885,542 B2* | 1/2021 | Panigrahi | G06F 16/9035 |
| 10,991,168 B2 | 4/2021 | Martin | |
| 11,151,481 B1* | 10/2021 | Sun | G06V 40/161 |
| 11,355,024 B2* | 6/2022 | Breed | G06F 21/86 |
| 11,436,906 B1* | 9/2022 | Peddinti | G08B 5/36 |
| 2004/0039577 A1* | 2/2004 | Roan | G06Q 30/02 348/143 |
| 2007/0133844 A1* | 6/2007 | Waehner | G06V 40/16 382/118 |
| 2007/0183634 A1* | 8/2007 | Dussich | G06V 40/173 382/118 |
| 2010/0306064 A1* | 12/2010 | Inselburg | G06Q 30/0275 715/733 |
| 2011/0075919 A1* | 3/2011 | Gokturk | G06V 40/172 382/159 |
| 2011/0255787 A1* | 10/2011 | Chang | H04M 1/72427 382/190 |
| 2012/0053833 A1* | 3/2012 | Kolodziej | G06Q 30/02 701/465 |
| 2012/0287281 A1* | 11/2012 | Williams | G06Q 30/02 348/148 |
| 2013/0279757 A1* | 10/2013 | Kephart | G06Q 10/02 382/105 |
| 2013/0297093 A1* | 11/2013 | Nowel | B66B 1/468 700/90 |
| 2014/0015930 A1* | 1/2014 | Sengupta | G06F 21/32 348/46 |
| 2014/0046845 A1* | 2/2014 | Dogin | G06Q 20/322 705/44 |
| 2015/0120341 A1* | 4/2015 | Scarborough | G06Q 10/02 705/5 |
| 2015/0205573 A1* | 7/2015 | Kaplan | G06Q 50/10 700/94 |
| 2015/0221151 A1* | 8/2015 | Bacco | H04W 12/64 340/5.83 |
| 2015/0324937 A1* | 11/2015 | Callahan | E04C 3/02 705/15 |
| 2015/0356664 A1* | 12/2015 | Mackler | G06Q 30/0635 705/26.81 |
| 2016/0004904 A1* | 1/2016 | Senechal | G16H 20/30 382/118 |
| 2017/0021257 A1* | 1/2017 | Olsen, II | G09B 19/06 |
| 2017/0053435 A1* | 2/2017 | Reymann | G07C 9/00563 |
| 2017/0161550 A1* | 6/2017 | Ranganath | H04N 23/73 |
| 2017/0278204 A1* | 9/2017 | Mimassi | G06Q 50/12 |
| 2017/0353699 A1* | 12/2017 | Wang | G08B 13/19695 |
| 2018/0052869 A1* | 2/2018 | McElmurray | G06F 16/583 |
| 2018/0240206 A1* | 8/2018 | Hawley | G06Q 50/12 |
| 2018/0308100 A1* | 10/2018 | Haukioja | G06Q 20/206 |
| 2018/0330814 A1* | 11/2018 | Auer | G16H 40/20 |
| 2018/0350171 A1* | 12/2018 | Weston | G07C 9/253 |
| 2019/0042936 A1* | 2/2019 | Guim Bernat | G06N 5/04 |
| 2019/0050631 A1* | 2/2019 | Hayase | G06V 40/172 |
| 2019/0098446 A1* | 3/2019 | Jain | H04W 4/029 |
| 2019/0253670 A1* | 8/2019 | Chien | F21S 4/28 |
| 2019/0354749 A1* | 11/2019 | Nazemi | G08B 13/19691 |
| 2020/0098223 A1* | 3/2020 | Lyons | G06Q 30/0269 |
| 2020/0193358 A1* | 6/2020 | Vick | G06F 3/017 |
| 2020/0272717 A1* | 8/2020 | Figueredo de Santana | G06V 40/172 |
| 2020/0372743 A1 | 11/2020 | Miller et al. | |
| 2021/0034844 A1* | 2/2021 | Kephart | G06V 20/52 |
| 2021/0042277 A1* | 2/2021 | Sloane | G06F 16/213 |
| 2021/0053530 A1* | 2/2021 | Bohl | B60R 25/102 |
| 2021/0074102 A1* | 3/2021 | Weston | G07C 9/253 |
| 2021/0144009 A1* | 5/2021 | Dinkelmann | G06Q 20/3278 |
| 2021/0222447 A1* | 7/2021 | Gorny | A63J 1/00 |
| 2021/0240969 A1* | 8/2021 | Edelen | G06F 16/51 |
| 2021/0279528 A1* | 9/2021 | Sachdeva | G06V 10/7784 |
| 2022/0140924 A1* | 5/2022 | Ahmed | H04L 67/12 370/329 |
| 2022/0207592 A1* | 6/2022 | Swanson | G06Q 30/0635 |

FOREIGN PATENT DOCUMENTS

| | | | | |
|---|---|---|---|---|
| CN | 104731471 | | 6/2015 | |
| CN | 104731471 A | * | 6/2015 | G06F 16/54 |
| CN | 110879981 | | 3/2020 | |
| CN | 110879981 A | * | 3/2020 | |
| WO | 2004093022 | | 10/2004 | |
| WO | WO-2004093022 A1 | * | 10/2004 | G06Q 20/04 |
| WO | 2009070660 | | 6/2009 | |
| WO | WO-2009070660 A1 | * | 6/2009 | G06Q 20/40 |
| WO | 2019079818 | | 4/2019 | |
| WO | WO-2019079818 A1 | * | 4/2019 | G03B 19/02 |
| WO | 2020101641 | | 5/2020 | |
| WO | WO-2020101641 A1 | * | 5/2020 | G02B 5/208 |
| WO | 2020112759 | | 6/2020 | |
| WO | WO-2020112759 A1 | * | 6/2020 | A63F 13/213 |
| WO | 2020220078 | | 11/2020 | |
| WO | WO-2020220078 A1 | * | 11/2020 | G06Q 10/02 |
| WO | 2021138342 | | 7/2021 | |
| WO | WO-2021138342 A1 | * | 7/2021 | G06K 9/00248 |
| WO | 2021192321 | | 9/2021 | |
| WO | WO-2021192321 A1 | * | 9/2021 | G06K 9/00 |
| WO | 2021222975 | | 11/2021 | |
| WO | WO-2021222975 A1 | * | 11/2021 | G06Q 10/02 |
| WO | 2022154842 | | 7/2022 | |
| WO | WO-2022154842 A1 | * | 7/2022 | |

* cited by examiner

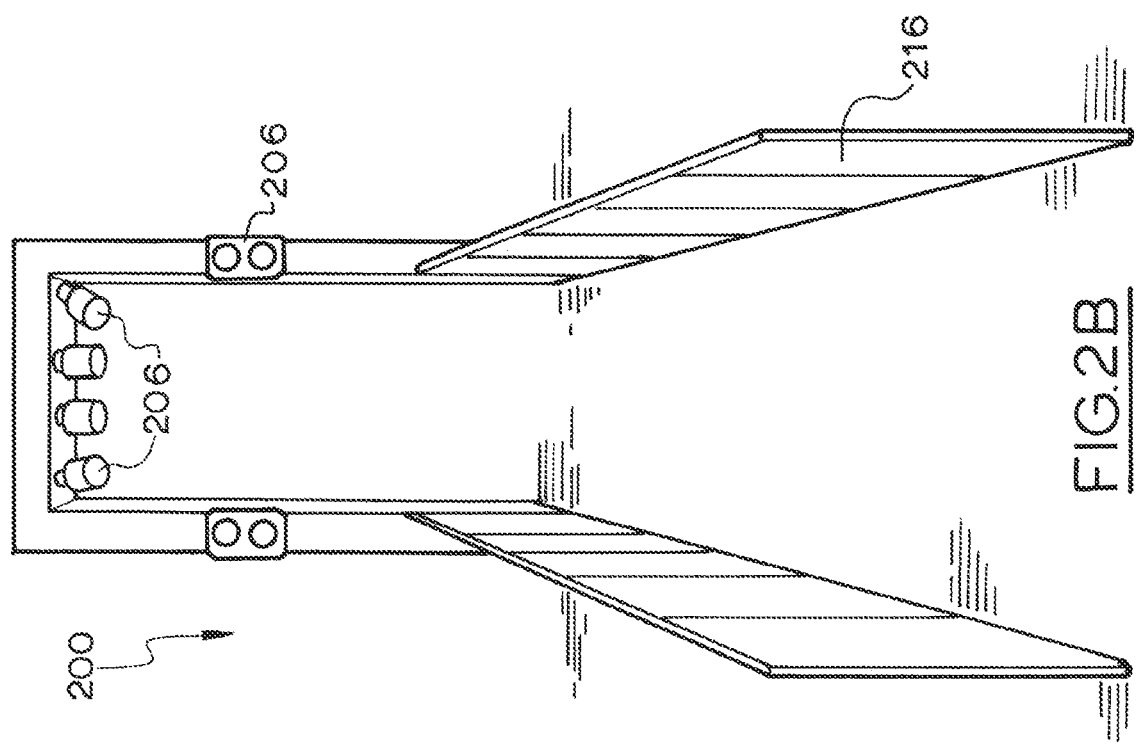
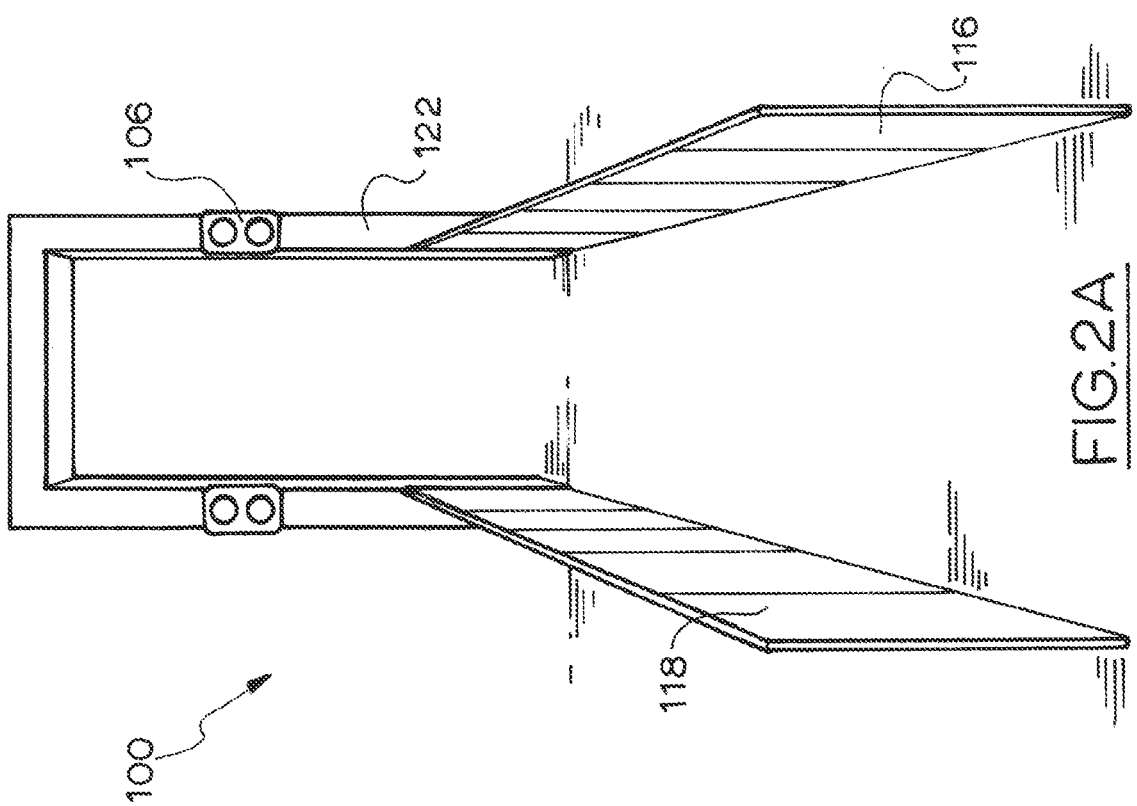

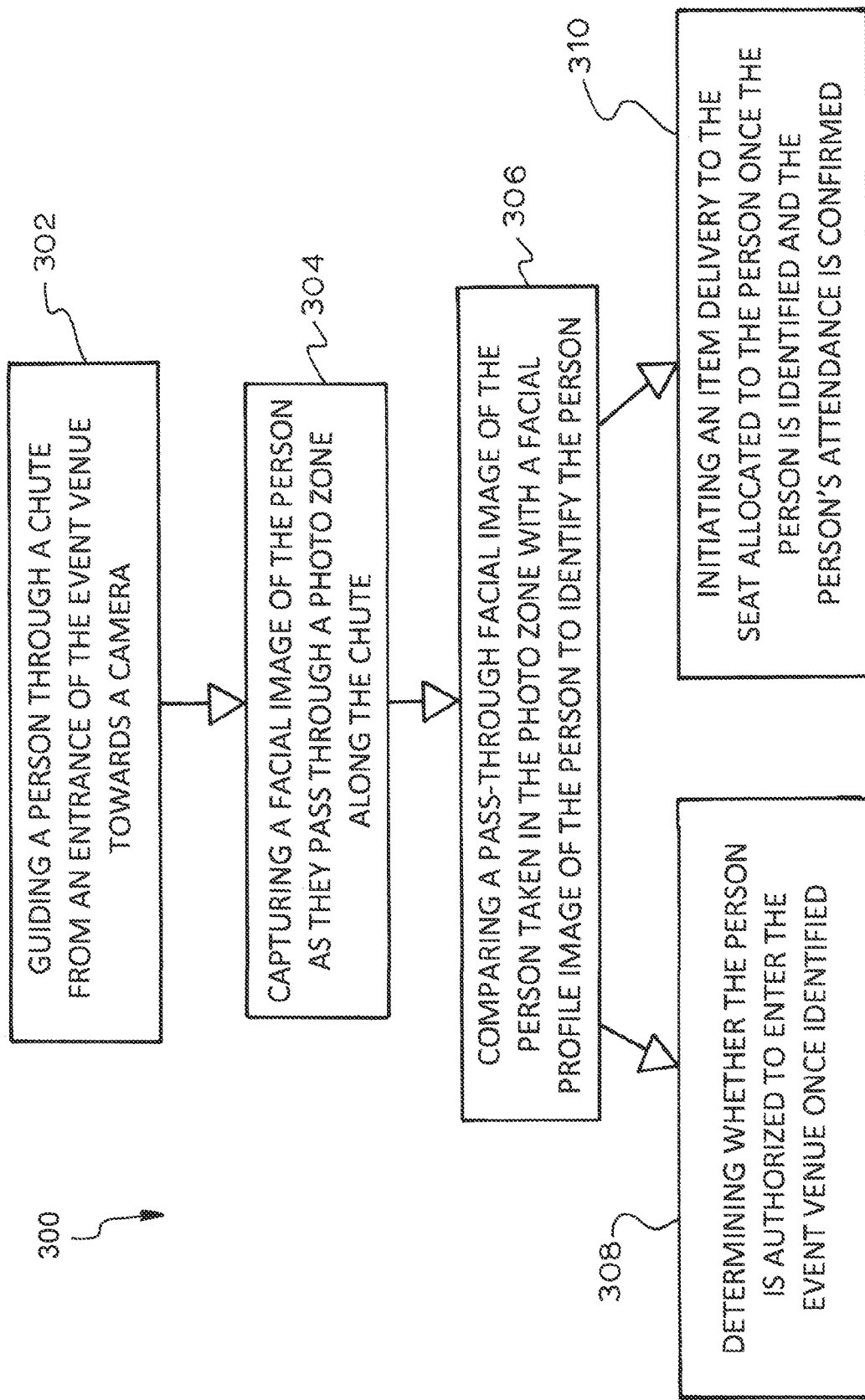

COMBINED FLOW-THRU FACIAL RECOGNITION FOR MASS SPECTATOR EVENT ENTRY AND ITEM FULFILLMENT SYSTEM AND METHOD

CROSS REFERENCE TO RELATED APPLICATIONS

This application is a continuation of U.S. Application Ser. No. 17/727,862, filed Apr. 25, 2022, which claims the benefit of U.S. Provisional Application Ser. No. 63/325,055, filed Ma. 29, 2022, the entire contents of each being incorporated by reference herein.

FIELD OF THE INVENTION

The present disclosure relates to improvements in systems and methods for facilitating expeditious and controlled entry of an influx of people to a mass attendee event without overwhelming event venue employees, while at the same time providing for procurement and delivery of one or more items to a person confirmed as authorized to enter the event to the person's location within the event.

BACKGROUND OF THE INVENTION

Event security has been a major problem at major mass attendance events, such as sporting events. Unruly fans, or even those with a criminal background or history for violence, have been known to enter large sporting event venues and cause problems, ruining a fan experience for many who are present to just enjoy a game or match. Another problem is that sporting event venues have to employ a large amount of people to visually check each ticket (electronic or physical) for each and every person entering the venue to ensure the person entering is authorized to enter. This results in a large expense for operators of the sporting event venue. For example, a large influx of event day spectators may overwhelm the limited number of venue volunteers or employees, increasing pressure on the volunteers or employees to rush the entry process so that spectators may get to their seat on time. Venue operators have to guess as to how many spectators might attend, and attempt to plan accordingly. Often times, this leads to not having enough resources, or having too many resources that then go to waste when less than estimated numbers of spectators show up.

A further problem, from the fan perspective, is having to wait in a long line or queue while the person simply wants to go to their seat, sit down and enjoy the game, match or sporting event. An important consideration is to then get the person to their allocated seat or location in an expeditious and efficient manner, with minimal delay. This fan-perspective problem is also present when the fan wants to obtain a food or beverage item during a break in the game/match, but again might have to contend with long lines, and potentially miss a critical moment in the game/match due to delays in getting back to the fan's seat.

What is needed is a system and method that renders the mass attendance event entry process and event attendance more efficient and fulfilling while minimalizing potential for errors.

SUMMARY

In a preferred aspect, the present disclosure sets forth a system or platform for contactless mass spectator event venue entry and item delivery for facilitating expeditious and controlled entry of an influx of people to the spectator event without overwhelming event venue employees. The system includes at least one side barrier configured to guide people from a venue entry point towards a photo zone leading to a limited-access area of the spectator event. The system further includes a camera configured to capture a pass-through image of a person as they move through the photo zone, and a user image database configured to store a profile image of the person prior to commencement of the event. The system further includes a processor configured to: compare the profile image stored in the user image database with the pass-through image of the person captured by the camera using facial recognition technology; determine whether the person is an authorized entrant as they move through the photo zone based on the comparison between the profile image and the pass-through image; and concurrently issue an item preparation instruction for preparation and delivery of the item directly to the person at an allocated event seating of the person within the event venue, based on the same comparison between the profile image and the pass-through image used to determine authorized event entry.

In a further preferred aspect, the present disclosure sets forth a method for contactless mass spectator event venue entry and item delivery for facilitating expeditious and controlled entry of an influx of people to the spectator event without overwhelming event venue employees. The method includes guiding a plurality of people through a guided entry way from a venue entry point towards a photo zone; taking at least one pass-through image of a person as the person moves through the photo zone; conducting a facial recognition comparison of the pass-through image of the person with a personal profile image of the person contained in a personal profile associated with person, the personal profile including a pre-authorization for event entry, and data fields for item procurement and item delivery directly to the person at an allocated seating of the person after the person enters the venue; confirming entry of the person upon successful identification of the person through the facial recognition comparison of the pass-through image and the profile image, and review of the personal profile associated with the person attempting to gain entry to the venue; and concurrently issuing an instruction for delivery of any item selected by the person prior to entry of the person through the photo zone.

As used herein, "configured" includes creating, changing, or modifying a program on a computer or network of computers so that the computer or network of computers behave according to a set of instructions. The programming to accomplish the various embodiments described herein will be apparent to a person of ordinary skill in the art after reviewing the present specification, and for simplicity, is not detailed herein. The programming may be stored on a computer readable medium, such as, but not limited to, a non-transitory computer readable storage medium (for example, hard disk, RAM, ROM, CD-ROM, USB memory stick, or other physical device), and/or the Cloud. The system may be implemented on a field-programable gate array and graphics processing unit.

It will be appreciated that in one or more embodiments, the system may include one or more workstations at a back end for use by a platform operator, one or more local client computers for access by users, and a communications network that facilitates communication between the platform, the workstations at the back end, and the client computers. Preferably, the workstations and client computers will include a display and means for entering information, such as a Graphic User Interface (GUI), a keyboard and/or voice activated data entry. Means for accessing the platform by users may include, but are not limited to personal computers and mobile devices such as tablets and smartphones, and other user devices capable of communicating over a communications network utilizing the Internet.

It is to be understood that both the foregoing general description and the following detailed description are exemplary and explanatory only and are not restrictive of the invention, as claimed, unless otherwise stated. In the present specification and claims, the word "comprising" and its derivatives including "comprises" and "comprise" include each of the stated integers, but does not exclude the inclusion of one or more further integers. The claims as filed with this application are hereby incorporated by reference in the description.

The accompanying drawings, which are incorporated in and constitute a part of this specification, illustrate several embodiments of the invention and together with the description, serve to explain the principles of one or more forms of the invention.

BRIEF DESCRIPTION OF THE FIGURES

FIG. 2A is front perspective view of a guided entry way to a photo zone where one or more nearby cameras take one or more images of a person as they move through.

FIG. 2B is a front perspective view of a guided entry way to a photo zone, which a series of alternating overhead cameras at the end of the entry way.

FIG. 5 is a flow diagram of a method for mass spectator event venue entry and item delivery system for facilitating expeditious and controlled entry of an influx of people to the event in accordance with an embodiment of the disclosure.

DETAILED DESCRIPTION OF THE DRAWINGS

Reference will now be made in detail to exemplary embodiments of the invention, some of which are illustrated in the accompanying drawing.

It will be appreciated that although the platform described below will be described in relation to a mass spectator sporting event, the platform and method is applicable to a variety of mass attendance events without limitation to just sporting events. Attendees could be spectators, fans, entrants, delegates, or other authorized persons. A particular label attributed to a person depends on the context of the event they are attending, but the below-described system/platform and method is applicable to a wide variety of mass attendance events without limitation to a particular type of mass attendance event, gathering, or situation.

Figure 1:
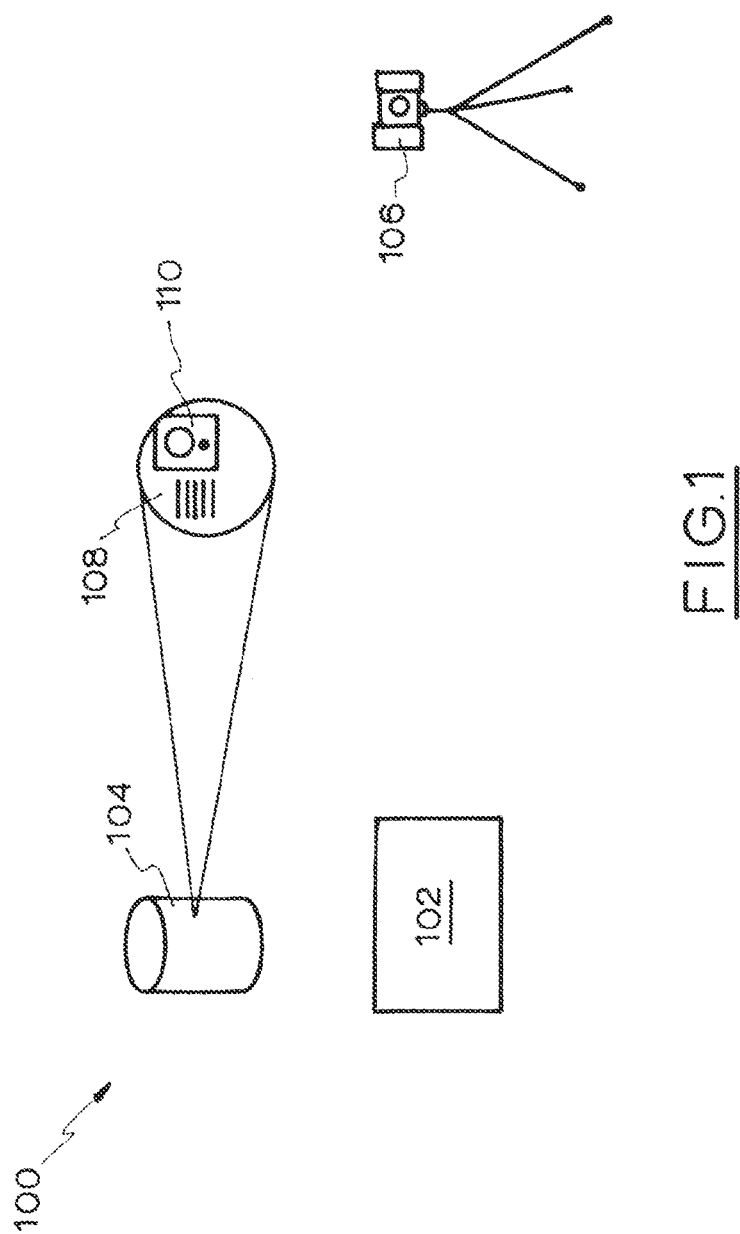
FIG. 1 is a diagram of system components in accordance with an embodiment of the disclosure.

FIG. 1 shows a preferred embodiment of a platform or system 100 having a processor 102, an electronic spectator database 104, and at least one digital image collection device 106. In use, a digital profile image of a person is captured and stored in electronic image database 104 prior to the start of the event. The person shows up to the sporting venue the day of the sporting event. An image collection device 106 located proximate the sporting event venue entry captures an entry image of the person, which is compared by processor 102 with the profile image stored on database 104 to identify the person. Once the person is identified at the sporting event venue, their personal profile is checked for the presence of a pre-authorisation for event entry, and any selection of one or more items for procurement and delivery to the person at an allocated seating of the person, all just by moving through the photo zone. The preferred elements of system 100 and their interrelationship are described below.

Referring to FIG. 1, system 100 is preferably a stand-alone system which may be in communication with a venue intranet, and/or the internet if desired. Processor 102 may be in the form of a microprocessor integrated with a camera within a camera housing. Processor 102 preferably includes a microchip, such as a System on Chip (SoC), with appropriate control circuitry. Processor 102 is preferably programmed with facial recognition technology so that facial images may be compared with each other to ascertain a match. Examples of suitable recognition algorithms include 3-D modelling, geometric and/or photometric approaches, linear discriminate analysis (LDA), support vector machine (SVM), Support Vector Machine-Recursive Feature Elimination (SVM-RFE), pattern matching, dynamic link matching, thermal imaging, and/or elastic bunch graph matching. The details of image recognition technology would be appreciated by those of ordinary skill in the art and are therefore not repeated here for simplicity.

Electronic spectator database 104 is preferably configured with a plurality of user profiles 108 with fields for user identification data such as name, address and contact details (electronic and telephone). Each user profile 108 preferably includes a provision for a digital profile image 110 for association with each person. Profile image 110 is preferably a picture that contains at least a facial portion of the person. Each user profile 108 also preferably includes one of more fields for entry or selection of an item for procurement, and optional delivery to any assigned seating of the person. Examples of item(s) that may be selected for procurement and delivery include, but are not limited to, an item of consumable food, a beverage, a souvenir, clothing, an event program, and/or a non-fungible token (NFT), such as an NFT associated with one or more sports personalities. In the situation where the item is an NFT item, the NFT may be electronically delivered to an account associated with the person, either while the person is attending the event, or at a time after conclusion of the particular event the person is attending.

A ledger of event entries for each person may be maintained using blockchain technology if desired. The details of blockchain technology would be appreciated by those of ordinary skill in the art.

The potential for misuse of facial recognition is high if not carefully managed. The public does not easily trust a large company with the use of private, personal data. To alleviate these legitimate concerns, one or more aspects of personal profile 108 may be configured to automatically self-delete after a predetermined amount of time and/or after a predetermined action or event. For example, one or more aspects of personal profile 108 may self-delete after a fixed time period of 3 days, 1 month, 1 year or 3 years in order to help ensure that a profile picture is kept up to date, or address privacy concerns, or even once the person has been confirmed as having entered into the sporting event for the intended day of entry. Profile 108 may self-delete after conclusion of the event, such as a sporting event in which the person attends.

System 100 further preferably includes at least one digital image collection device such as camera 106. The digital image collection device may be any device or means configured to capture a digital image, such as, but not limited to a camera, for example, a stand-alone digital camera, a video camera, a thermal camera, and/or a device having an integrated or component camera, such as a tablet computer, a laptop computer, or a mobile communications device such as a smartphone. Digital images captured by the digital image collection device may be stored on a computer-readable storage medium associated with processor 102 (for example, hard disk, server, Cloud); and/or a computer-readable storage medium associated with the digital image collection device; and/or a separate, transferable computer-readable storage medium (for example, flash drive (USB) or disc). Images may include static images or frames from a video.

Camera 106 may be adapted for depth-detection and may include a laser and/or a 3-D rangefinder to facilitate depth detection.

In use, a person creates a digital personal profile. The person provides their identity data into predefined fields and uploads a profile picture to database 104. If the event venue offers items or services for procurement and/or delivery, the person may select a desired item/service from a menu, or may otherwise enter an item/service for procurement/delivery into one or more fields of the personal profile. Selection of the item/service is preferably completed prior to entry of the person into the sporting event venue, and more preferably, before the person moves through a photo zone (described further below). Once the person has established their profile on database 104, the person may travel to the venue and proceed with the entry/item procurement and delivery process, detailed further below.

Figure 4:
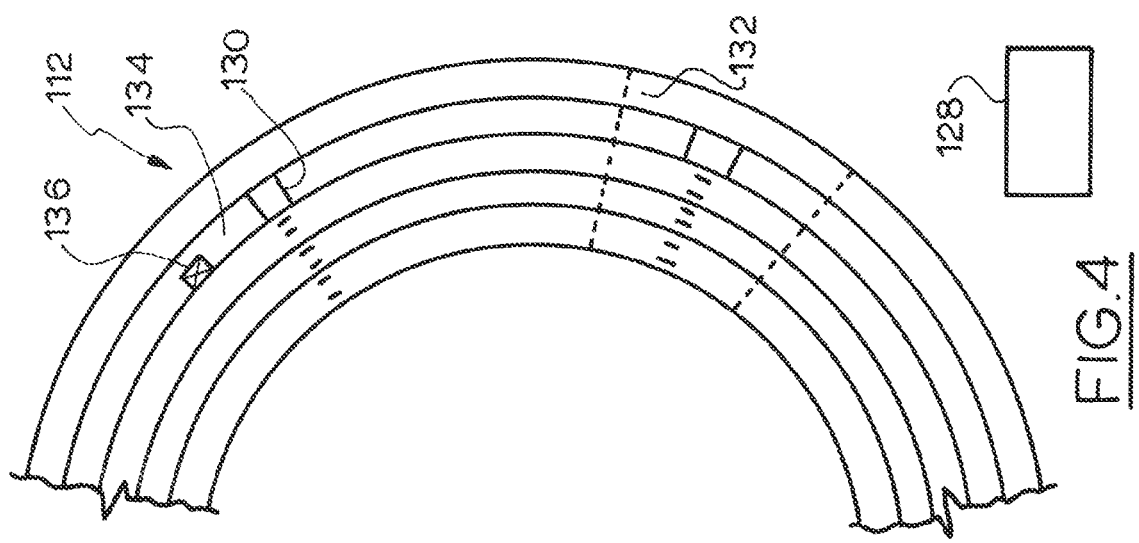
FIG. 4 is a partial top plan view of an interior of an event area with stadium seating.
Figure 3:
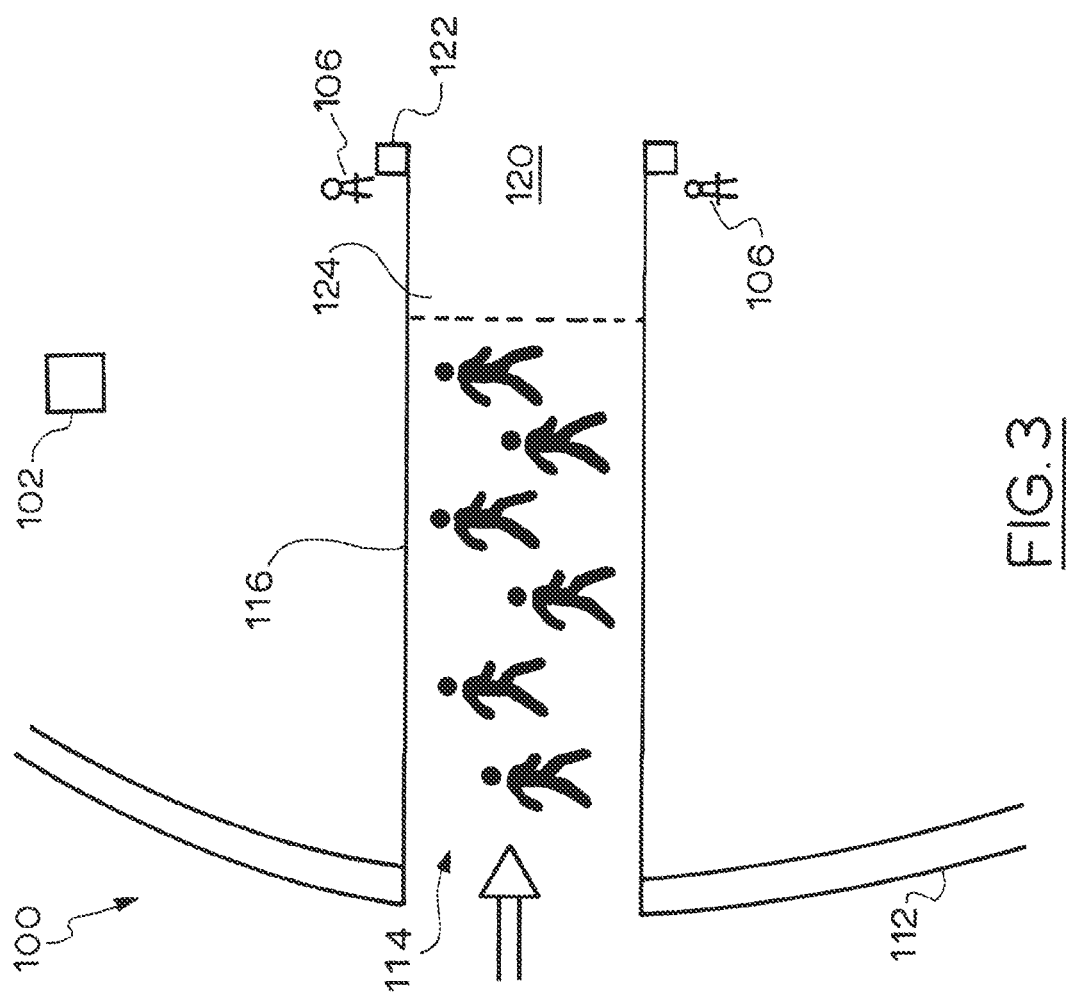
FIG. 3 is a top perspective view of the guided entry way of FIG. 2A, shown leading from an event venue entry through a photo zone leading to an interior of the event venue.

FIGS. 2A and 3 show an entry way configuration through a restricted area of a sporting event venue. Referring now to FIGS. 2A, 3, and 4, system 100 is shown placed at a stadium 112. Stadium 112 includes one or more entrances 114. An entryway, isle or chute 116 is placed at the entrance to guide spectators from the entrance towards one or more cameras 106. Chute 116 includes a barrier wall 118 that leads to restricted area 120. Chute 116 preferably includes a gantry 122 at an end furthest away from entrance 114, e.g., an exit. Gantry 122 includes one or more of cameras 106, which may be placed on a pole of the gantry, or separately of the gantry. Chute 116 further leads to a photo zone 124 just prior to gantry 122. Photo zone 124 is preferably an area where the spectators pass or move through while their picture is taken for purposes of a facial recognition identification (described further below).

It will be appreciated that it is not always practical to position an image collection device directly in the path of an oncoming spectator. Processor 102 may be configured with one or more recognition algorithms suitable for side, or angled side profiles. Such algorithms may be modified to compare the distance between a point on the ear (e.g., concha or lobule) and a point on the eye (e.g., iris), and/or the distance between a point on the ear and a point on a nose (e.g., tip), and/or a ratio comparing the distance between a point on the ear and eye and the distance between a point on the ear and the nose. Where opposed cameras are used to capture left side, right side and/or oblique profiles of the spectator, the images captured by each camera may either be individually analyzed, or more preferably, merged to generate a composite image which is analyzed.

FIG. 2B shows a system 200 with an alternative chute camera configuration. Chute 216 preferably includes a series of alternating cameras 206 positioned along an elevated or overhead position at or proximate an exit of the entryway to capture forward and/or overhead perspective views of a spectator approaching and crossing the entry. Additional cameras may be positioned medially and/or laterally (left and/or right) of the entryway, and/or forward of the entryway. Proximate the entryway, one or more cameras may be positioned at a lower elevation so that the digital entry image is captured at an angle below a horizontal plane intersecting a chin of the spectator, or where desired, below a horizontal plane intersecting a waist of a spectator. Other camera angles may be used as desired.

Referring to FIGS. 3 and 4, once the spectator is identified by processor 102, the spectator's personal profile 108 is checked for a presence of an item procurement and delivery, such as food, beverage, souvenir(s), clothing, and/or NFT(s). If personal profile 106 includes instructions for an item obtainment and/or delivery, then processor 102 sends instructions to item preparation module 128 to initiate preparing the item or article, and then arranging for the item delivery directly to the spectator's section 132, row 134 and seat 136, which may be at a time preselected by the spectator. Delivery of the item may be physically achieved by one or more venue employees by travel through seating area 130 leading to the spectator's seating area. Item delivery may be achieved in other ways as desired. For example, the use of drones (land and/or air-based) may be used as appropriate, or delivery to specific sections of the venue where the person may pick up the selected item. Electronic delivery may be achieved by sending a link to the person's electronic account, such as for delivery of an NFT.

As part of the profile stored in database 104, user or spectator preferences for items such as food, beverage, souvenirs, and/or NFTs may be used to enhance fan experience. For example, if a fan desires a beer at a particular time during the game or match, the preference may be noted in the profile so that the item may be provide or delivered directly to the fan or spectator at a desired time and location. As a further example, the fan may desire to have a beer 10 minutes into a football game or rugby match. The profile may include the preference data so that 10 minutes after the official start of the game or match, a beverage service station will commence delivery of the beer to the seat (section, row, seat number) of the fan or spectator. This has the advantage of eliminating standing in a long line or queue during a game or match break, and the fan or spectator potentially missing a crucial moment of the game or match due to standing in a line or queue. In short, by including an item pre-selection in the profile, the fan/spectator can "skip the line," reserving any potential waiting in line to actions such as going to the toilet when necessary.

With appropriate spectator permissions in place, system 100 may be configured to identify and track a wearable device on the spectator so that as the spectator makes their way to their seat in the sporting event, the system will track the spectator's position along the sporting event venue. Examples of wearable devices include, but are not limited to, an RFID chip, a smartphone, a watch, a device insertable in a shoe, and eyewear. The watch may include GPS circuitry and/or a wireless radio transmitter for network Wi-Fi communications and/or peer-to-peer communications, as will be further described below. A communications interface forming part of the system may be used to collect data via a communications means such as satellite, cellular technology, NFC, WLAN, and/or peer-to-peer communications (e.g., Bluetooth and/or Wi-Fi Direct) from the spectator as the spectator moves within the sporting venue. The spectator's movement data may be directly uploaded into the system from the spectator's own personal device. Where the wearable device utilises a peer-to-peer technology such as Bluetooth and/or Wi-Fi Direct, sensors with appropriately configured transceivers may be positioned within the sporting venue as appropriate for the communications range of such devices. Examples of suitable sensors include Bluetooth beacons. The details of Bluetooth beacons would be appreciated by those of ordinary skill in the art and are therefore not repeated here for simplicity.

Where multiple cameras are utilized, the cameras may be adapted to form a wired or wireless peer-to-peer network with each other and/or with processor 102. For example, each camera 106 may include a radio transceiver configured for Bluetooth and/or Wi-Fi Direct communications with other cameras and/or processor 102.

The identification is preferably made using solely the images of the spectator. Most preferably, the images are matched using facial recognition technology, the details of which would be appreciated by those of ordinary skill in the art. An example of an image recognition registration system and method is described in PCT Publication No. WO2019/079818, the entire contents of which is incorporated by reference herein. If desired, more than one category of features may be used as part of the image recognition process. For example, facial features and at least one non-facial feature may be used to identify a user in a digital image captured during the sporting event. For example, a portion of an article of clothing may be used in combination with a facial feature to assist in identifying a user as a participant.

System 100 is preferably configured so that as the person moves through photo zone 124, camera 106 takes a series of photos of the person, and processor 102 is configured to analyze the image series and select an image therefrom that is primarily or best suited for facial recognition analysis. The selection is based on a minimum quality threshold that preferably includes optical recognition of key facial data points, such as user eye location relative to user nose and/or cheek bone location. Processor 102 is configured to determine authorized entry and initiate item preparation/delivery as the person moves through the photo zone. For example, the facial recognition comparison and identification is conducted using the best-determined image from the image series as the person is moving through the photo zone (using a constantly updatable analysis of the image series as the image series is being expanded by the person moving through the photo zone). Once a minimum recognition threshold is achieved, and recognition is successful, further expansion of the image series is not needed for a particular identified individual unless used to double-check identification. The minimum threshold may be set at a suitable percentage, such as 90% accuracy, depending upon the accuracy desired for a particular purpose. High accuracy may be achieved by stationary positioning of individuals for facial recognition, but this of course greatly impacts efficiency of entrants getting to their seat on time, and is therefore less desirable.

Other personal features may be used to identify a spectator in instances where the face may be partially or totally obscured. For example, head dimensions (for example, the distance between the ears), the distance between the ends of the shoulders, thermal imaging, and/or general body shape (for example, torso width and/or body height) may be used to help identify a spectator.

Spectator identification may be enhanced by incorporating pattern recognition and machine learning algorithms into the system. Behaviour and non-behaviour features may be analyzed to increase accuracy of identification. Examples of behaviour features include past attendance history in a sporting event (e.g., a spectator attending in an annual sporting event multiple times), calendar events (e.g., spectator travel periods, and sporting event type (e.g., NFL football games, rugby matches, European football (or soccer) matches, etc.). Examples of non-behavioural features include biometric data (e.g., age, gender, body build) and geolocation data (residential location, sporting event location). Behaviour, non-behaviour, or any combination behaviour and non-behaviour features may be used to enhance spectator identification.

The features may be weighted to increase accuracy. For example, attendance history may be given an initial weighting of 50%, geolocation may be given a weighting of 35%, calendar event(s) given a weighting of 10%, and biometric data given a weighting of 5%. Where geolocation is used as a factor, a spectator's residential address (obtained from profile 108) may serve as an initial a geolocation point with a fixed radius to define a surrounding target area. Sporting events located within the target area are given a higher weighting. Sporting events tending to match the spectator's past type of sporting event attendance (e.g., an NFL football game) are given a higher weighting. Pattern recognition may also be used to weight a spectator's likelihood of attending a particular event where the spectator has previously attended, with increased past attendance at an event being used to increase the weight given towards a particular event.

As a practical example, if an image of a spectator is captured at the venue entry, and the image is partially obscured, or the image only provides, for example, a 60% identification accuracy, processor 102 may utilize an enhanced recognition algorithm with a feature set including attendance history, geolocation data, calendar event data and biometric data to increase the accuracy and positive identification rate. The processor may be configured to check whether the individual is already recognized, and if not, then scan the database for individuals who have a residence within the target area of the sporting event, who have attended in the current event (if it is a regular or annual event), who have a history of attending in the same or similar event type and distance, and biometric features such as gender, age, and body type. The features may be weighted and varied in order to optimize accuracy (e.g., geolocation being weighted more than event attendance history).

It will be appreciated that pattern recognition and machine learning may be implemented through appropriate classifiers, such as an artificial neural network. Support Vector Machine-Recursive Feature Elimination (SVM-RFE), and/or any of the techniques detailed in PCT Publication No. WO 2021/173871, the description of which is hereby incorporated by reference herein, may be applied as appropriate to enhance spectator identification. The basic details of machine learning and pattern recognition methods would be understood by those of ordinary skill in the art and are therefore not repeated here for simplicity.

The platform may be configured, if desired, to detect the approach of a spectator using an electronic identification broadcast from the spectator's wearable device as they approach the photo zone. Upon detecting the approach of a spectator, the platform signals a communications hub at the photo zone to initiate the image capturing process described above. Contact details associated with the electronic identification broadcast may be provided by the spectator prior to the sporting event via their personal profile.

Having described the preferred components of system 100, a preferred method 300 for contactless mass spectator event venue entry and item delivery for facilitating expeditious and controlled entry of an influx of people to the spectator event without overwhelming event venue employees or resources will now be described with reference to FIGS. 1 to 5. The method preferably includes a step 302 of guiding a person through chute 116 from entrance 114 of the event venue towards camera 106. A facial image of the person is captured as they move or pass through photo zone 124 along chute 116 in step 304. Thereafter, in step 306, the pass-through facial image of the person taken in photo zone 124 is compared with the facial image of the person to identify the person. In step 308, it is determined whether the person is authorized to enter the event venue once identified, by checking, for example, personal profile 108. Preferably concurrently with step 308, in step 310, an item delivery is initiated to the seat allocated to the person once the person is identified and the person's attendance at the event venue is confirmed. The allocated seating may include a section number, row number, and seat number assigned to the person within the venue, which is particularly appropriate for stadium seating. If desired, seat allocation within a venue may be supplied to a smart device such as a smartphone after a person's entry into the venue is confirmed.

The foregoing description is by way of example only, and may be varied considerably without departing from the scope of the disclosure. For example only, the processor may be integrated with the camera within the same housing as the camera, substantially reducing system errors or opportunities for system disruptions from accidental wire disconnections. The chute may be configured in a variety of patterns to accommodate a particular venue entry, and need not be strictly linear in configuration. A variety of movements through the chute and/or photo zone may be accommodated, such as the person walking, running, or even a person in movement device/vehicle such as a wheelchair or scooter. For a person walking through the photo zone, the person is preferably walking at an ordinary human walking gait. Online resources such as those available through the Cleveland Clinic or Johns Hopkins University provide information around ordinary human walking gait.

To flag people who may attempt to enter a venue in an unauthorized way, or who remain unidentified due to insufficient image quality, a verification bay may be positioned off to the side of the chute after the photo zone. Venue personnel may be alerted the presence of an unauthorized or unidentified person, and direct that individual to the verification bay for identification, either with a portable image device to take an appropriate facial image, or other device to scan or collect details to identify the person and permit passage and entry of the person to the event. In this situation, the system may use a combination of free-flowing facial recognition with stationary facial recognition (as a fallback) to identify some individuals for whom the free-flowing facial recognition has not adequately produced a recognition.

If desired, an item procurement, or additional item procurement, may be facilitated once a person is seated within the venue through use of an App on the person's smartphone. Procurement may be facilitated through facial recognition technology (using the smartphone's camera), and item delivery facilitated by the smartphone GPS circuitry, and/or allocated seating associated with the person.

To enhance security, a bag check may be included with appropriate scanners to detect items brought by visitors to the venue which could pose a risk to other people at the venue, or attempts by visitors to bring in prohibited items into the venue (e.g., weapons, cameras, recording devices, food and/or beverages, etc.).

The platform may be configured for use with sporting activities other than football games, rugby matches, or soccer games. For example only, the platform may be configured for use with sports such as tennis matches, horse races, swimming competitions, or large scale sporting spectator events such as international competitions (e.g., the Olympics). Other mass spectator events include exhibitions, political gatherings, speaking engagements, concerts, plays or shows, or any event where a sizeable number of people (e.g., 100 or more people) might gather. Indeed, in a preferred form, the platform can be adapted to facilitate efficient entry of tens of thousands of people, with opportunity to deliver pre-selected items at a person's allocated location within a large event venue.

Information or data normally stored at a physical location may be stored in the Cloud, considerably reducing the hardware needed for memory requirements often associated with large volumes of data.

The features described with respect to one embodiment may be applied to other embodiments, or combined with or interchanged with the features of other embodiments, as appropriate, without departing from the scope of the disclosure.

The present disclosure in one or more preferred forms provides the advantages of confirming entry of attendees into a mass attendance event in a seamless, free-flowing manner and reduced opportunity for error. This permits better allocation of human resources and reduces material waste. For example, labor costs are reduced by lessening a need for ticket-checkers at all entrances. From an attendee's or spectator's perspective, more freedom is provided to attend and focus on the event without worrying about standing in long lines for event entry and/or concession item procurement. Using a single image recognition event for both venue entry and item procurement significantly reduces time otherwise needed for various actions, streamlines the entire experience, and reduces expenditure by the venue operator. The contactless nature of the system and method reduce disease or viral transmission risk, an important consideration for mass attendance events during a pandemic. These advantages are particularly pronounced with free-flowing image or facial recognition. It will of course be appreciated by those of ordinary skill in the art that various benefits and advantages may be obtained without incorporating all elements or features described herein.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A ticketless mass spectator event venue entry and item delivery system for facilitating expeditious and controlled entry of an influx of people to the spectator event without overwhelming event venue employees, the system comprising:
    at least one camera for placement in a photo zone leading to a limited-access area of the spectator event, said camera being configured to capture a series of pass-through images of a group of people as they move through the photo zone;

a detection sensor synced to said camera to initiate image capture with said camera as at least one person from the group encounters a detection zone to activate said sensor;

a user image database configured to store a profile image of the person prior to commencement of the event; and a processor configured to:

compare the profile image stored in said user image database with the pass-through image of the group captured by said camera using facial recognition technology;

determine whether the person is an authorized entrant as they move through the photo zone based on the comparison between the profile image and the pass-through image, said processor being configured to analyze the image series and select an image therefrom based on a minimum threshold including optical recognition of key facial data points, wherein the minimum threshold is based on a percentage of accuracy, said processor being configured to identify the person using only free-flowing facial recognition technology as a primary method of identification, said processor being configured to use a secondary method of identification where the minimum threshold is not reached;

confirming entry of the person into the event venue as they move towards the limited-access area; and concurrently issue an item preparation instruction for preparation and delivery of an item either directly to the person at an event seating allocated to the person within the event venue or at a specific section of the venue where the person may pick up the item, the item preparation instruction being based on the same comparison between the profile image and the pass-through image used to determine authorized event entry, combined event entry authorization and item preparation instructions being actuated just by the person being successfully identified.

2. The entry system of claim 1, wherein said camera is configured to analyze the image series and select an image therefrom that is primarily suited for facial recognition analysis.

3. The entry system of claim 2, wherein the selection is based on a minimum quality threshold including optical recognition of key facial data points.

4. The entry system of claim 3, wherein the key facial data points include user eye location relative to user nose and/or cheek bone location.

5. The entry system of claim 1, wherein said processor is integrated with said camera within a camera housing.

6. The entry system of claim 1, wherein the item preparation and delivery involves a consumable food item or beverage.

7. The entry system of claim 1, wherein the allocated seating includes a section number, row number, and seat number assigned to the person within the event venue.

8. A method for ticketless mass spectator event venue entry for facilitating expeditious and controlled entry of an influx of people to the spectator event without overwhelming event venue employees, the method comprising:

guiding a group of people through a guided entry way from a venue entry point towards a photo zone;

taking a series of pass-through images of the group as they move through the photo zone with a camera synced to a detection sensor to initiate image capture with said camera as at least one person from the group encounters a detection zone to activate the sensor;

conducting, as a primary method of identification, a free-flowing facial recognition comparison of at least one of the pass-through images of the group with a personal profile image of the person contained in a personal profile associated with person, as the person moves towards the limited-access area, the conducting of the free-flowing facial recognition comparison including determining whether at least one of the pass-through images meets a minimum threshold including optical recognition of key facial data points, wherein the minimum threshold is based on a percentage of accuracy, the personal profile including:

a pre-authorization for event entry; and data fields for item procurement and item delivery either directly to the person at an allocated seating of the person, or to a specific section of the venue where the person may pick up the item, after the person enters the venue;

determining the minimum threshold is not reached, and conducting a secondary method of identification;

confirming entry of the person upon successful identification of the person, and review of the personal profile associated with the person attempting to gain entry to the venue; and concurrently issuing an instruction for delivery of any item which was selected by the person prior to entry of the person through the photo zone, combined event entry authorization and item delivery instructions being actuated just by the person being successfully identified.

9. The entry method of claim 8, wherein the person's seat within the venue is not allocated until after entry of the person into the event is confirmed by the comparison of the pass-through and profile images.

10. The entry method of claim 8, wherein allocation of the person's seat within the venue is provided to a smart device associated with the person.

11. The entry method of claim 8, wherein the item procurement includes selections associated with a consumable food and/or beverage.

12. The entry method of claim 8, wherein the conducting of the facial recognition comparison includes determining a primary facial pass-through image from a series of pass-through images of the person as they move through the photo zone.

13. The entry method of claim 12, wherein the determination of the primary facial pass-through image is based on a minimum quality threshold including optical recognition of key facial data points.

14. The entry method of claim 13, wherein the key facial data points include user eye location relative to user nose and/or cheek bone location.

15. The entry method of claim 8, wherein the instruction for item procurement and delivery is conducted without any verbal instructions to event venue personnel, and without selection of the item while at the event venue.

16. The entry method of claim 8, wherein the facial recognition comparison is conducted while the person is walking through the photo zone.

* * * * *